United States Patent [19]

Fisch et al.

[11] Patent Number: 5,120,487
[45] Date of Patent: Jun. 9, 1992

[54] METHOD OF MEASURING THE DC ELECTRIC FIELD AND OTHER TOKAMAK PARAMETERS

[75] Inventors: Nathaniel J. Fisch, Princeton; Arnold H. Kirtz, Princeton Junction, both of N.J.

[73] Assignee: The United States of America as represented by the United States Department of Energy, Washington, D.C.

[21] Appl. No.: 486,660

[22] Filed: Mar. 1, 1990

[51] Int. Cl.⁵ .............................................. G21B 1/00
[52] U.S. Cl. .................................................. 376/143
[58] Field of Search ........................................ 376/143

[56] References Cited

U.S. PATENT DOCUMENTS 3,779,864 12/1973 Kaw et al. ............................ 376/143
4,661,304 4/1987 Perkins, Jr. et al. ................. 376/132

OTHER PUBLICATIONS

Diagnostics For Fusion Reactor Conditions, vol. 1, Sep. 1982, Costley, pp. 129-165.
Diagnostics For Neutral Beam Heated Tokamaks, Dec. 1982, PPPL-1951, Goldston, p. 10.
Diagnostics For Fusion Experiment, Sep. 1978, Fidone et al, pp. 241-252.

Primary Examiner—Daniel D. Wasil
Attorney, Agent, or Firm—Helen S. Cordell; John M. Albrecht; William R. Moser

[57] ABSTRACT

A method including externally imposing an impulsive momentum-space flux to perturb hot tokamak electrons thereby producing a transient synchrotron radiation signal, in frequency-time space, and the inference, using very fast algorithms, of plasma parameters including the effective ion charge state $Z_{eff}$, the direction of the magnetic field, and the position and width in velocity space of the impulsive momentum-space flux, and, in particular, the dc toroidal electric field.

11 Claims, 2 Drawing Sheets

METHOD OF MEASURING THE DC ELECTRIC FIELD AND OTHER TOKAMAK PARAMETERS

CONTRACTUAL ORIGIN OF THE INVENTION

The United States Government has rights in this invention pursuant to Contract No. DE-AC02-76CH03073 between the U.S. Department of Energy and Princeton University.

BACKGROUND OF THE INVENTION

This invention relates to measurement of plasma parameters in a tokamak. In particular, this invention departs from the prior art by enabling measurement of the dc toroidal electric field E in a tokamak plasma. Using this invention, a brief, deliberate perturbation of hot tokamak electrons produces a transient synchrotron radiation signal, in frequency-time space, and plasma parameters including the dc electric field can be inferred from the radiation response.

The use of synchrotron emission to deduce plasma properties is an established and important technique. Generally, transient synchrotron emission is used for information on the electron temperature; recently there have been attempts to uncover further details of the electron momentum distribution function f. Prior art methods are limited, however, in that deduction of details of the electron distribution function is based on the synchrotron emission from the entire distribution of electrons; consequently, only one-dimensional data (in frequency) can be used to constrain f.

Measurement of the dc parallel electric field has been unavailable using methods of the prior art. Typically less than a volt per meter in a tokamak, this field is far too small to be inferred through atomic phenomena, and cannot be measured directly by probes because the plasma is too hot. Its effect is manifest, however, in the dynamics of superthermal electrons—those that synchrotron radiate most profusely.

It is the primary object of this invention to provide a method for measurement of the dc toroidal electric field E in a tokamak plasma.

In the accomplishment of the foregoing object, it is another important object of this invention to provide a method for inferring other parameters of tokamak plasma from the transient radiation response produced by brief perturbation of the plasma.

It is another important object of this invention to provide a method for distinguishing the steady dc electric field from noise.

It is a further object of this invention to present method for comparing parameter sets that might possibly explain an incremental transient signal and for estimating the informative worth of the data prior to obtaining it.

Additional objects, advantages and novel features of the invention will become apparent to those skilled in the art upon examination of the following and by practice of the invention.

SUMMARY OF THE INVENTION

To achieve the foregoing and other objects, this invention comprises a method including a brief, this deliberate perturbation of hot tokamak electrons which produces a transient synchrotron radiation signal, in frequency-time space, and the inference, using very fast algorithms, of plasma parameters including the effective ion charge state $Z_{eff}$, the direction of the magnetic field, and the position and width in velocity space of the brief heating, and, in particular, the dc toroidal electric field. In addition, this invention includes a method for comparing essentially all parameter sets that might possibly explain the transient signal, and, by simulating data, for estimating the informative worth of data prior to obtaining it.

BRIEF DESCRIPTION OF THE DRAWINGS

The present invention is illustrated in the accompanying drawings where.

DETAILED DESCRIPTION OF THE INVENTION

When superthermal electrons are heated briefly in a tokamak plasma, the change in the electron distribution function, particularly at high energy, is manifest in a change, or increment in the synchrotron emission. Since the excitation is brief, the changes incurred in both the electron distribution function and the synchrotron emission are transient. Thus, the incremental synchrotron radiation is a two-dimensional pattern in frequency-time space. The details of this pattern are governed by plasma parameters; for example, the higher the plasma density, the faster the decay of the incremental radiation.

As is well known in the prior art, high-velocity, superthermal electrons radiate most copiously, but lose energy slowly, so that there can be independent time points in the radiation pattern R ($\omega$,t). Dominated by Coulomb collisions and the dc electric field, these electrons mainly flow along the magnetic field, largely immune to temperature fluctuations and other turbulence in the bulk of the ion or electron distributions. Because relatively few parameters govern this response, given powerful analytic tools and the method of this invention, it is possible to determine the parameters from the radiation response.

A relatively modest diagnostic embodiment of the current invention relies upon a brief, probing rf signal that leads to the incremental synchrotron signal, and an array of frequency detectors with submillisecond time resolution.

Figure 1B:
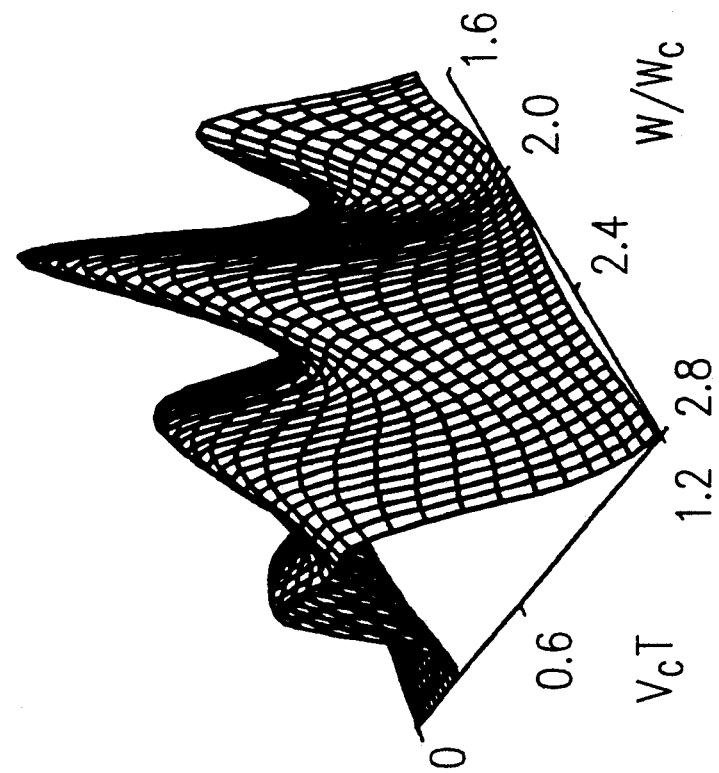
FIGS. 1a and 1b are graphs depicting the incremental synchrotron radiation response R ($\omega$, t) at extraordinary polarization for different electric fields.
Figure 1A:
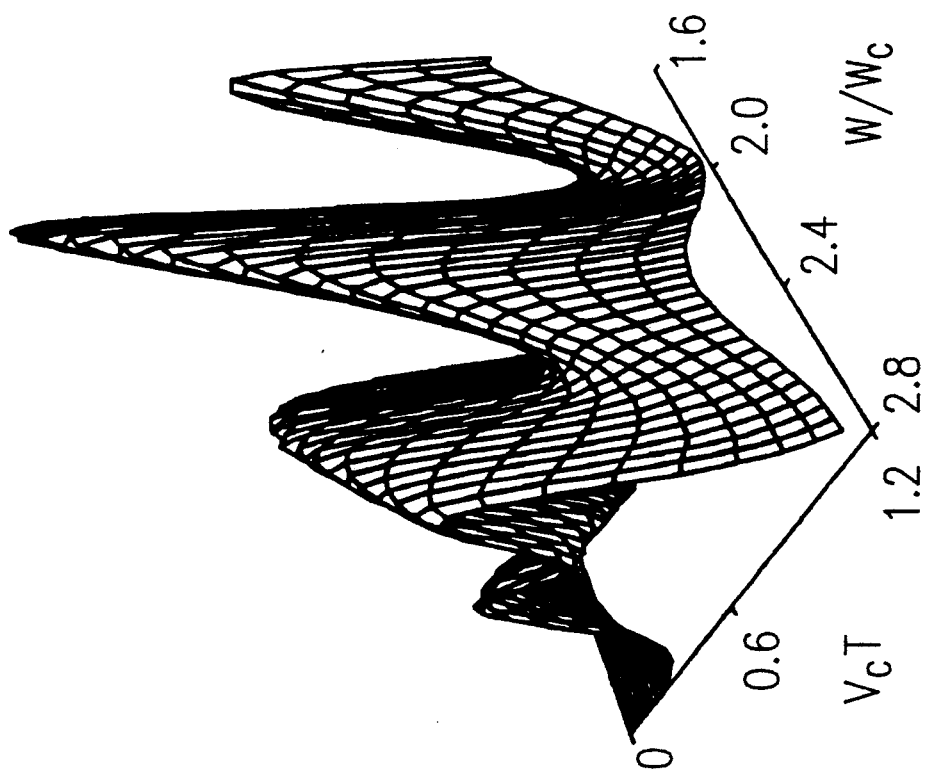

FIGS. 1a and 1b numerically simulate the incremental synchrotron radiation response to a deliberate, brief heating of the plasma (e.g., by lower-hydrid waves) to produce radiation directly attributable to this probe. Both FIGS. 1a and 1b exhibit radiation at several harmonics from electrons initially with about 700 keV parallel energy, or tail electrons in a 20-keV reactor plasma. In FIG. 1a the parallel dc electric field corresponds to 0.02 V/m at density $10^{14}$/cm³; in FIG. 1b it is $-0.0067$ V/m.

The incremental or transient radiation response is defined as $R(\omega,t;\zeta) \equiv R_{tot}(\omega,t;\zeta) - R_{back}(\omega,t;\zeta)$, where $R_{back}$ is the background radiation associated with a relatively constant distribution function and R is the incremental radiation specifically due to the externally imposed impulsive momentum-space flux $\Gamma(p,t)$. We can then write the distribution function f as $f = f_m(1 + \phi_B + \phi)$, where $f_m$ is a Maxwellian distribution, $\phi_B$ describes the relatively constant deviation from Maxwellian of the background distribution, and $\phi$ describes the time-dependent distribution specifically associated with the source $\Gamma$. For problems of interest, in terms of contributing to the collision integral, both $\phi_B$ and $\phi$ may be treated as small, so that f obeys the linearized Fokker-Planck equation. The evolution of $\phi$ is then governed, after the brief excitation, by Coulomb collisions and the dc electric field, $$f_M \partial \phi / \partial t + qE \cdot \nabla_p \partial_M \phi - C(\phi) = 0 \tag{1}$$

with initial condition $f_M \phi(p,t=0) = Q(p)$, which is the result of the impulse $\Gamma$. The incremental or transient radiation response, viewed at angle $\zeta$ with respect to the magnetic field is then $$R(\omega, t; \zeta) = \int d^3 p f_M \phi(p,t) I(\omega, p; \zeta), \tag{2}$$

where the radiation intensity I can be of ordinary or extraordinary polarization; for the latter, $I = I^x$, we have $$I^x(\omega, \zeta, u) = \sum_n \frac{e^2 \omega^2}{2\pi c \lambda^2} \left( \frac{u}{\gamma} \right)^2 (1 - \tag{3}$$

$$\mu^2) J_n'^2 \left( n \frac{u}{\gamma} (1 - \mu^2)^{\frac{1}{2}} \frac{\cos \zeta}{\lambda} \right) \delta(\omega - n \omega_c / \gamma \lambda),$$

where n is the cyclotron harmonic, $J_n$ is the derivative of the nth Bessel function of the first kind, $\omega_c = eB/mc$ is the cyclotron frequency of nonrelativistic electrons, $\mu = p/mc$, $\gamma^2(u) \equiv 1 + u^2$, $\mu \equiv p_{11}/p$, and $\lambda = 1 - u\mu \sin \zeta / \gamma$ is the extent of the Doppler shift through viewing the radiation signal at angle $\zeta$.

Very fast algorithms have been developed for solving for the radiation response $R(\omega, t)$. The fast algorithms make feasible a statistical analysis which would otherwise be unthinkable, and exploit several properties of Eqs. (1)–(3). First, note that Eqs. (1)–(3) admit several scale invariant transformations of the radiation response $R(\omega, t)$. Having solved for $R(\omega, t; \theta)$, where $\theta$ is a set of parametric dependences which includes the magnetic field amplitude B, the electric field E, the density n, the viewing angle I and the perturbation amplitude Q, we also have for any constants $\alpha_1$, $\alpha_2$, and $\alpha_3$, $$R(\omega, t; \alpha_1 B, \alpha_2 Q, \alpha_3 n, E) = \alpha_1 \alpha_2 R(\omega / \alpha_1, t / \alpha_3; B, Q, n, E / \alpha_3). \tag{4}$$

The impulsive heating can be arranged to affect only nonrunaway electrons, so that Eq. (4) simplifies further through the linearization $R = R_0 + ER_1$.

Second, since Eq. (1) is linear in $\phi$, a Green's function, $\psi$, can be defined for the radiation response. We write the radiation response as an integral over initial condition Q(p), $$R(\omega, t; \zeta) = \int d^3 u \, \psi(\omega, p, t; \zeta) Q(p). \tag{5}$$

The Green's function makes efficient the simultaneous consideration of many perturbations Q(p).

Third, choosing to perturb electrons on the tail of the distribution function (i.e. superthermal electrons but not runaways) makes possible an analytic solution for $\psi$. For these electrons, energy diffusion by collisions is ignorable compared to energy loss. The Green's function for the radiation response, $\psi$, solves the relativistic Fokker-Planck adjoint equation, which we write as $$\frac{\partial \psi}{\partial \tau} - \epsilon \frac{\partial \psi}{\partial u_1} + \frac{1}{u^3} \left( \gamma^2 u \frac{\partial \psi}{\partial u} - \gamma \frac{1 + Z_{eff}}{2} \frac{\partial}{\partial \mu} (1 - \mu^2) \frac{\partial}{\partial \mu} \psi \right) = 0, \tag{6}$$

written for superthermal excitation in the high-velocity limit and in terms of the normalized variables $\tau = \nu_c t$, $\nu_c = nq^4 \ln \Lambda / 4\pi m^2 \epsilon_0^2 c^3$, and $E = q E/mc\nu_c$, and to be solved with the following initial condition $\psi(\omega, u; \zeta, \tau = 0) = I(\omega, u; \zeta)$.

An analytic solution is available as follows: separate $\psi$ and the initial conditions into Legendre harmonics $[\psi(u, \mu, \tau) = \Sigma_k P_k(\mu) \psi_k(u, \tau)]$, expand in the electric field $[\psi_k(u, \tau) = \psi_k^{(0)} + E\psi_k^{(1)} + \ldots$, and then integrate the equation for $\psi_k^{(0)}$ along characteristics to obtain $$\psi_k^{(0)} = I_k(x) \left[ \frac{1 + \gamma(u)}{u} \right]^{\alpha_k} / \left[ \frac{1 + \gamma(x)}{x} \right]^{\alpha_k}, \tag{7}$$

where $\alpha_k \equiv k(k+1) (Z_{eff}+1)2$, and the characteristic function $X(\tau, u)$ can be written as $x = g^{-1}[g(u) - \tau]$, with $g(u) \equiv u - \tan^{-1} u$; $g^{-1}$ is defined such that $g^{-1}[g(u)] = 1$. The equation governing $\Psi_k^{(1)}$ to be solved with homogeneous initial conditions, is driven by the kth Legendre harmonic of $\partial \psi^{(0)} / \partial \mu_{11}$; fortunately, this inhomogeneous term can be simplified enormously so that $\psi_k^{(1)}$ can be put into an efficient closed form.

These fast algorithms enable consideration of essentially all competing parameter sets that might possibly explain obtained data. More than that, the worth of data can be estimated prior to obtaining it. Suppose that experimental measurements are of the following form $R_x(\omega, t) = R(\omega, t) + \bar{R}(\omega, t)$, where the extraneous signal $\bar{R}(\omega, t)$ is Gaussian noise, uncorrelated in both frequency and time, with $(\bar{R}) = 0$ and $(\bar{R}^2) = \sigma^2$. Given this model for data generation, and given a set of plasma parameters $\{\theta\}$, we can express the probability $P(R_x | \theta; \sigma)$ of generating a specific data set $R_x$ in the presence of noise characterized by $\sigma$ Given an a priori distribution $P(\theta)$ for the parameter set $\{\theta\}$, by Bayes's theorem we can write $P(\theta | R_x; \sigma) = P(R_x | \theta; \sigma) P(\theta) / P(R_x)$. The probability distribution of the plasma parameter set $\{\theta\}$, given that the data were obtained in the presence of noise $\sigma$ and generated with the specific plasma parameter set $\{\theta_P\}$, can now be written as $$P(\theta | \theta_p; \sigma) = \sum_{\{R_x\}} P(\theta | R_x; \sigma) P(R_x | \theta_p; \sigma) = \tag{8}$$

$$\lim_{N_R \to \infty} \frac{1}{N_R} \sum_{j=1}^{N_R} P(\theta | R_x^{(j)}; \sigma)$$

where, in the first equality, the summation over all possible data sets $\{R_x\}$ is both unfeasible and, in practice, unnecessary; the second equality obtains, since, by construction, $P(\theta | R_x; \sigma)$ is sampled with probability $P(R_x | \theta_p; \sigma)$. Generally $N_R \sim 80$ suffices to approximate $P(\theta | \theta_p; \sigma)$. Of course, the fast algorithms for generating $R(\omega,t)$ are indispensable, since R must be obtained for each competitive data set.

Carrying out a program of examining $P(\theta|\theta_p;\sigma)$ with various sets of plasma and heating parameters unknown, we find that the a priori probabilities $P(\theta)$ can be improved upon meaningfully. To take an example of particular interest, consider the simultaneous viewing of radiation from the core periphery of a tokamak, where in a coarse model, the two regimes have, respectively, densities $n_c$ and $n_p$, and electric fields $E_c$ and $E_p$. In other relevant respects, such as viewing angle or ion charge state, the two regimes are presumed identical. One detector then sums $$R(\omega,t) = Q_c R(\omega,t;n_c,\epsilon_c) + Q_p R(\omega,t;n_p,\epsilon_p),$$

where $Q_c$, $Q_p$, $\epsilon_c$, and $\epsilon_p$ are assumed unknown, but $n_c$ and $n_p$ are known from other measurements. Of course, where $n_c = n_p$, there would be no distinguishing the radiation source. However, even a 10% variation in density is exploitable.

Figure 2:
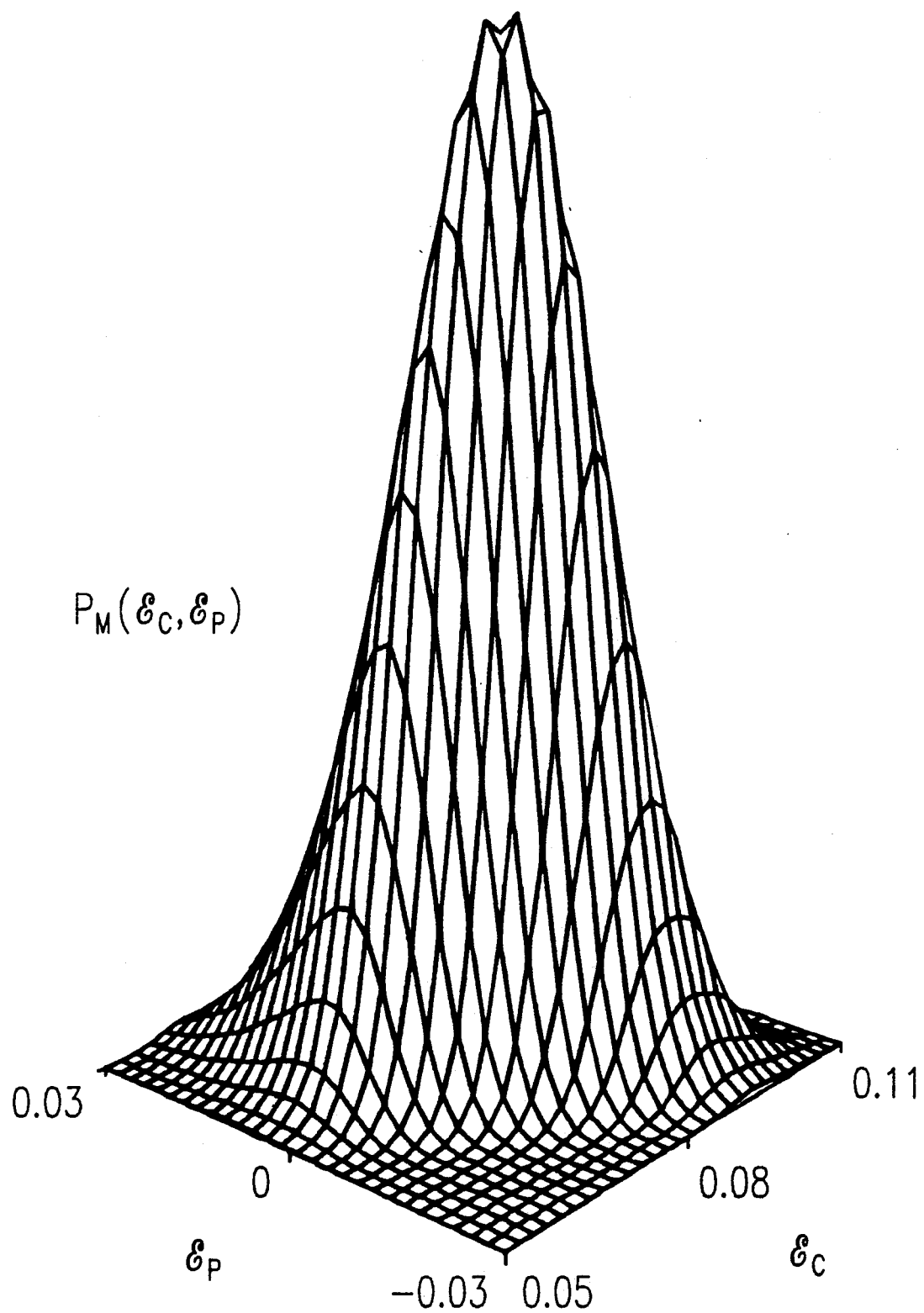
FIG. 2 is a graph depicting simulated data, showing the marginal joint probability distribution of electric fields E.

In FIG. 2, data were simulated on a 40×40 grid in frequency-time space, with noise $\sigma$ of 10% of the maximum signal $R(\omega,t)$. In practice, purely experimental noise can be kept much lower and a larger differential in density makes this discrimination much easier. As shown in FIG. 2, the marginal probability distribution $P(\epsilon_c, \epsilon_p)$ (the joint probability summed over all $\{Q_c, Q_p\}$) reveals the true parameters $E_c = 0.08$, $E_p 0$, i.e., a loop voltage on axis not yet relaxed via magnetic diffusion.

The model employed can be improved upon in several ways, particularly in accounting for cross-field transport due to imperfect magnetic surfaces. Accounting for losses of the fast electrons can probably be done analytically by introducing only a few new parameters; the fast algorithms should remain useful and the inference problem should remain tractable. Of course, in many instances the model as presented may suffice.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A method for inferring a plasma parameter of a tokamak plasma, including:
   externally imposing an impulsive momentum-space flux to perturb hot tokamak electrons thereby producing an incremental synchrotron radiation signal,
   measurement of the frequency-time space pattern of said incremental synchrotron radiation using an array of frequency detectors with submillisecond time resolution, and, inference from said pattern of a plasma parameter which governs said radiation.

2. The method of claim 1 wherein said plasma parameter is the effective ion charge state $Z_{eff}$.

3. The method of claim 1 wherein said plasma parameter is the direction of the magnetic field.

4. The method of claim 1 wherein said plasma parameter is the position and width in velocity space of said impulsive momentum-space flux.

5. The method of claim 1 wherein said plasma parameter is the dc toroidal electric field.

6. The method of claim 1 wherein said deliberate perturbation of hot tokamak electrons is caused by the introduction of lower-hybrid waves into the tokamak; said waves having parallel phase velocities substantially superthermal such that these waves produce a transient population of superthermal electrons.

7. The method of claim 1 wherein the incremental radiation detected is of either extraordinary or ordinary polarization.

8. The method of claim 1 wherein fast algorithms are used to measure said incremental synchrotron radiation.

9. The method of claim 8 wherein said fast algorithms include the Green's function response and the scale and variant transformations.

10. The method of claim 1 wherein an array of detectors accepting radiation from different lines of sight within the tokamak are employed.

11. A method for inferring a plasma parameter of a tokamak plasma, including:
   imposition of an impulsive momentum-space flux to perturb superthermal electrons in said tokamak plasma thereby producing an increment in synchrotron emission,
   measurement of frequency and time of said increment in synchrotron emission, and,
   inference from said measurement of one of the group of plasma parameters consisting of the effective ion charge state $Z_{eff}$, the direction of the magnetic field, the position and width in velocity space of the impulsive momentum-space flux, and the dc toroidal electric field.

* * * * *

UNITED STATES PATENT AND TRADEMARK OFFICE
CERTIFICATE OF CORRECTION

PATENT NO.   :   5,120,487
DATED        :   June 9, 1992
INVENTOR(S)  :   Nathaniel J. Fisch, et al It is certified that error appears in the above-indentified patent and that said Letters Patent is hereby corrected as shown below:

On title page, item [75], change "Kirtz" to --Kritz--.

Signed and Sealed this

Fourteenth Day of September, 1993

Attest:

BRUCE LEHMAN

*Attesting Officer*       *Commissioner of Patents and Trademarks*